United States Patent [19]
Goodnow et al.

[11] Patent Number: 6,141,351
[45] Date of Patent: Oct. 31, 2000

[54] RADIO FREQUENCY BUS FOR BROADBAND MICROPROCESSOR COMMUNICATIONS

[75] Inventors: Kenneth Joseph Goodnow, Essex Junction; Michel Salib Michail, South Burlington; Wilbur David Pricer, Charlotte; Sebastian Theodore Ventrone, South Burlington, all of Vt.

[73] Assignee: International Business Machines Corporation, Armonk, N.Y.

[21] Appl. No.: 08/770,355

[22] Filed: Dec. 20, 1996

[51] Int. Cl.[7] .................................................. H04L 12/403
[52] U.S. Cl. ............................................. 370/449; 370/451
[58] Field of Search ...................................... 370/364, 389, 370/438, 461, 462, 463, 465, 480, 489, 295, 451, 362, 447, 437, 436, 449, 330, 347, 319, 329, 343, 346; 455/463, 452, 465, 512

[56] References Cited

U.S. PATENT DOCUMENTS

| | | | |
|---|---|---|---|
| 3,983,540 | 9/1976 | Keller et al. .............................. | 710/121 |
| 4,328,581 | 5/1982 | Harmon et al. . | |
| 4,580,016 | 4/1986 | Williamson . | |
| 4,630,282 | 12/1986 | Landers et al. . | |
| 4,665,519 | 5/1987 | Kirchner et al. . | |
| 4,905,234 | 2/1990 | Childress et al. . | |
| 4,955,021 | 9/1990 | Wei ......................................... | 370/401 |
| 5,041,963 | 8/1991 | Ebersole et al. . | |
| 5,191,652 | 3/1993 | Dias et al. . | |
| 5,363,428 | 11/1994 | Nagashima ............................... | 455/452 |
| 5,394,436 | 2/1995 | Meier et al. . | |
| 5,463,624 | 10/1995 | Hogg et al. .............................. | 370/461 |
| 5,471,474 | 11/1995 | Grobicki et al. . | |
| 5,490,087 | 2/1996 | Redden et al. .......................... | 455/427 |
| 5,555,413 | 9/1996 | Lohman et al. ......................... | 395/733 |
| 5,561,669 | 10/1996 | Lenny et al. ............................. | 370/352 |
| 5,598,542 | 1/1997 | Leung ..................................... | 395/297 |
| 5,604,865 | 2/1997 | Lentz et al. ........................ | 395/200.08 |
| 5,615,211 | 3/1997 | Santore et al. .......................... | 370/419 |
| 5,727,179 | 3/1998 | Dei ......................................... | 395/416 |
| 5,734,843 | 3/1998 | Gephardt et al. ....................... | 395/287 |
| 5,754,800 | 5/1998 | Lentz et al. ............................. | 395/296 |
| 5,771,358 | 6/1998 | LaBerge ................................. | 395/287 |
| 5,796,961 | 8/1998 | O'Brien ................................. | 395/287 |

OTHER PUBLICATIONS

Newton's Telecom Dictionary, Harry Newton, p. 559, Mar. 1, 1998.

*Primary Examiner*—Chau Nguyen
*Assistant Examiner*—Chiho Andrew Lee
*Attorney, Agent, or Firm*—Schmeiser, Olsen & Watts; Eugene I. Shkurko

[57] ABSTRACT

Disclosed is a system for providing broader bandwidth in microprocessor bus, board and system designs. Broader bandwidth is achieved by dividing the full spectrum of frequencies available into discrete bandwidth packages, much like radio communications. The system includes a bus that is controlled by a traffic controller that polls for communication requests on the bus and then allocates bandwidth among the devices submitting such requests.

15 Claims, 4 Drawing Sheets

RADIO FREQUENCY BUS FOR BROADBAND MICROPROCESSOR COMMUNICATIONS

BACKGROUND OF THE INVENTION

1. Technical Field

The present invention relates to communications systems and more particularly to a radio frequency bus for broadband microprocessor communications.

2. Related Art

The limitations associated with high speed communications at the microprocessor bus level represent one of the biggest challenges the computer industry faces as it enters the twenty first century. Performance improvements in computer bus, board and system designs have been, and will continue to be, far outpaced by the microprocessor itself. Thus, while the microprocessor is processing data at higher and higher rates of speed, the flow of information to nearby devices (such as memory, hard drives, etc.) is being limited by the speed with which the system bus operates.

Performance improvements in microprocessor design include advances in silicon technology, enhanced levels of integration and the introduction of parallel execution. In contrast, board design advances have been limited due to the relatively fixed physical dimensions of the board, box, pluggable sockets and bus. In addition, advances in board design have been severely hampered by the requirement of "pluggable options," such as memory devices, modems, graphics cards, etc. that must plug into relatively standardized slots. Moreover, because board designers do not know what devices the bus will eventually service, the bus represents a transmission line system that can not be properly terminated or even easily characterized.

Past attempts to increase bus performance by operating at higher frequencies have resulted in degraded communications plagued with multiple reflections and resonances that corrupt the data being transferred. Such problems have only been solved by restricting the pluggable options in order to make the transmission lines better behaved.

Furthermore, while it is possible to increase bandwidth within the microprocessor by making the communication bus wider (e.g., by adding a few thousand more wires), the solution is impractical outside of the processor where system boards and pluggable slots are of a finite dimension. Thus, a need exists for an improved transmission line system to handle advances in microprocessor performance.

SUMMARY OF THE INVENTION

The present invention provides an improved transmission line system for computer system bus communications. The invention seeks to utilize a frequency division multiplexing system to allow for parallel communications over discrete frequency bands along the wiring that makes up the system bus. By dividing the frequency spectrum into individual bandwidth packets, many different "parallel" communications can occur at the same time.

A preferred embodiment of this invention includes a bus coupled to a plurality of sending and receiving nodes (devices). The plurality of sending nodes include means for sending signals over any of a predetermined set of frequency bands and the plurality of receiving nodes include means for receiving signals over any of the same predetermined set of frequency bands. The invention further includes a traffic controller coupled to the bus. The traffic controller includes means for receiving communication requests from the sending nodes and means for dynamically assigning frequency bands to the sending and receiving nodes as needed to handle their requests.

In addition, the traffic controller may include a polling system for detecting communication requests either over a dedicated frequency band or dedicated set of wires, and the sending nodes would likewise include means for sending the requests. In addition to communication requests, the sending nodes would also include means for sending transfer characteristic data over a sub-carrier frequency associated with the particular frequency band being used. Each of the receiving nodes would include means for receiving the transfer characteristic data for processing the incoming signals (e.g., adjusting the input gain and setting the threshold level).

The traffic controller further includes means for arbitrating the communication requests, means for dynamically assigning bandwidth for the devices requesting bandwidth, and means for instructing the respective devices to use their assigned bandwidth.

Finally, the system may include a dissipative resistance device coupled to every wire of the bus to improve the individual transfer characteristics for each frequency band being used.

It is therefore an advantage of the present invention to provide broader bandwith for microprocessor bus communications.

It is therefore a further advantage of the present invention to provide a plurality of frequency bands over a single bus for parallel communications.

It is therefore a further advantage of the present invention to provide a traffic controller for dynamically allocating bandwidth amongst two or more communication paths.

It is therefore a further advantage of the present invention to provide a microprocessor bus system that will not restrict pluggable devices.

It is therefore a further advantage of the present invention to provide a communication system wherein the entire bandwidth of the system board bus is always available for some form of shared use such that a single slow user cannot tie up the entire system bus.

The foregoing and other objects, features and advantages of the invention will be more apparent from the following more particular description of the preferred embodiments of the invention as illustrated in the accompanying drawings.

BRIEF DESCRIPTION OF THE DRAWINGS

The preferred exemplary embodiment of the present invention will hereinafter be described in conjunction with the appended drawings, where like designations denote like elements and.

BEST MODE FOR CARRYING OUT THE INVENTION

Figure 1:
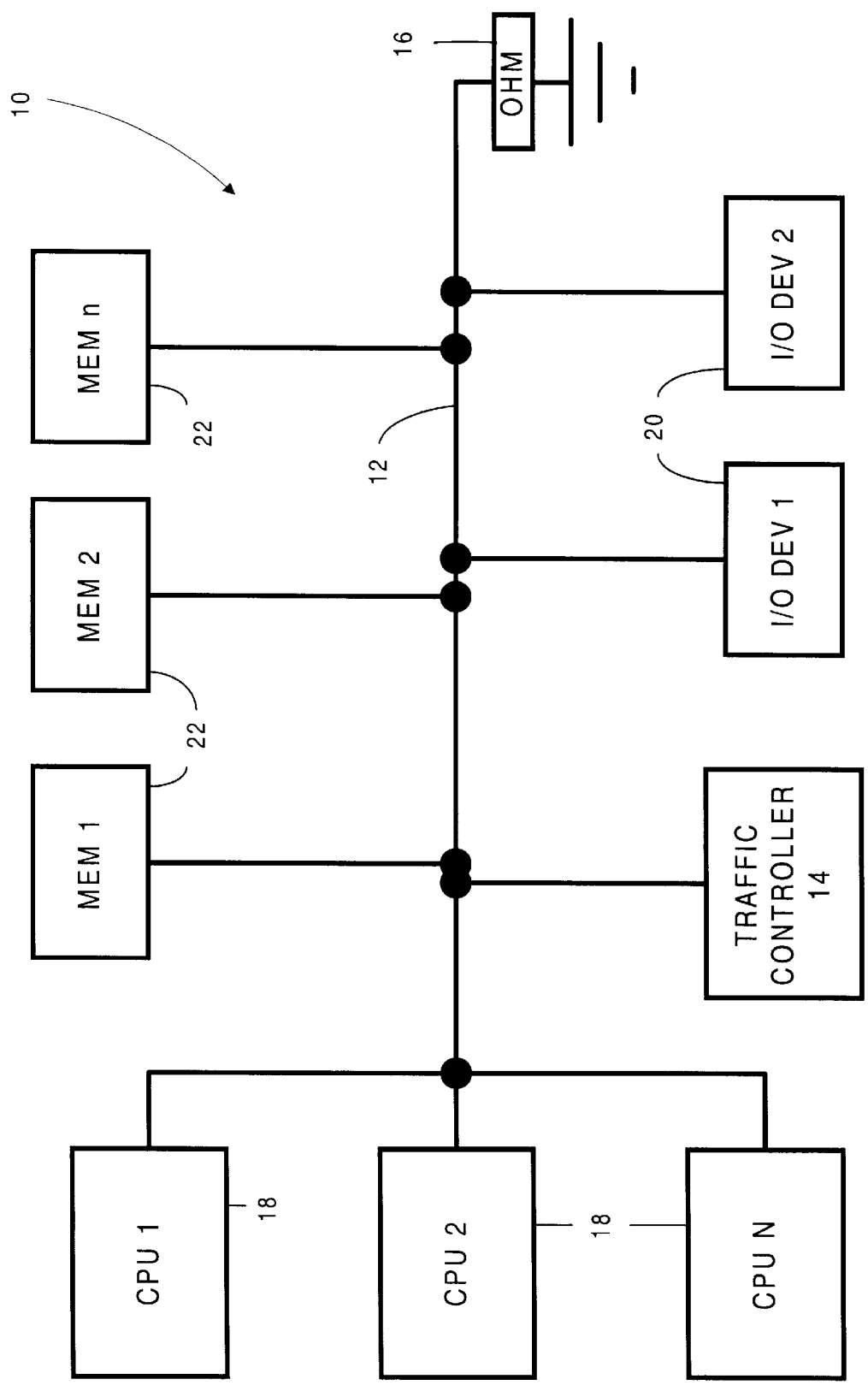
FIG. 1 depicts a microprocessor bus communication system in accordance with a preferred embodiment of the present invention.

Referring now to FIG. 1, a microprocessor based communication system 10 is shown. The system 10 includes a bus 12 that is shared by numerous devices, such as CPU devices 18, memory devices 22, and I/O devices 20. Each of these devices include means for sending and/or receiving data over any one of a plurality of frequency bands thereby making it possible to have simultaneous communications over bus 12. For instance, CPU 2 may be transmitting data to MEM 1 at the same time that I/O device 1 is transmitting data to CPU 1.

The system is regulated by traffic controller 14, which determines what frequency bands will be utilized for any of the requested communications. Finally, the system includes a dissipative resistance 16 on each wire of the bus for maintaining a well behaved system. It should be recognized that FIG. 1 merely represents one possible transmission line communication scheme. It is envisioned that the present invention may be applicable to any system wherein multiple devices share a single bus and require simultaneous communication amongst each other.

Figure 2:
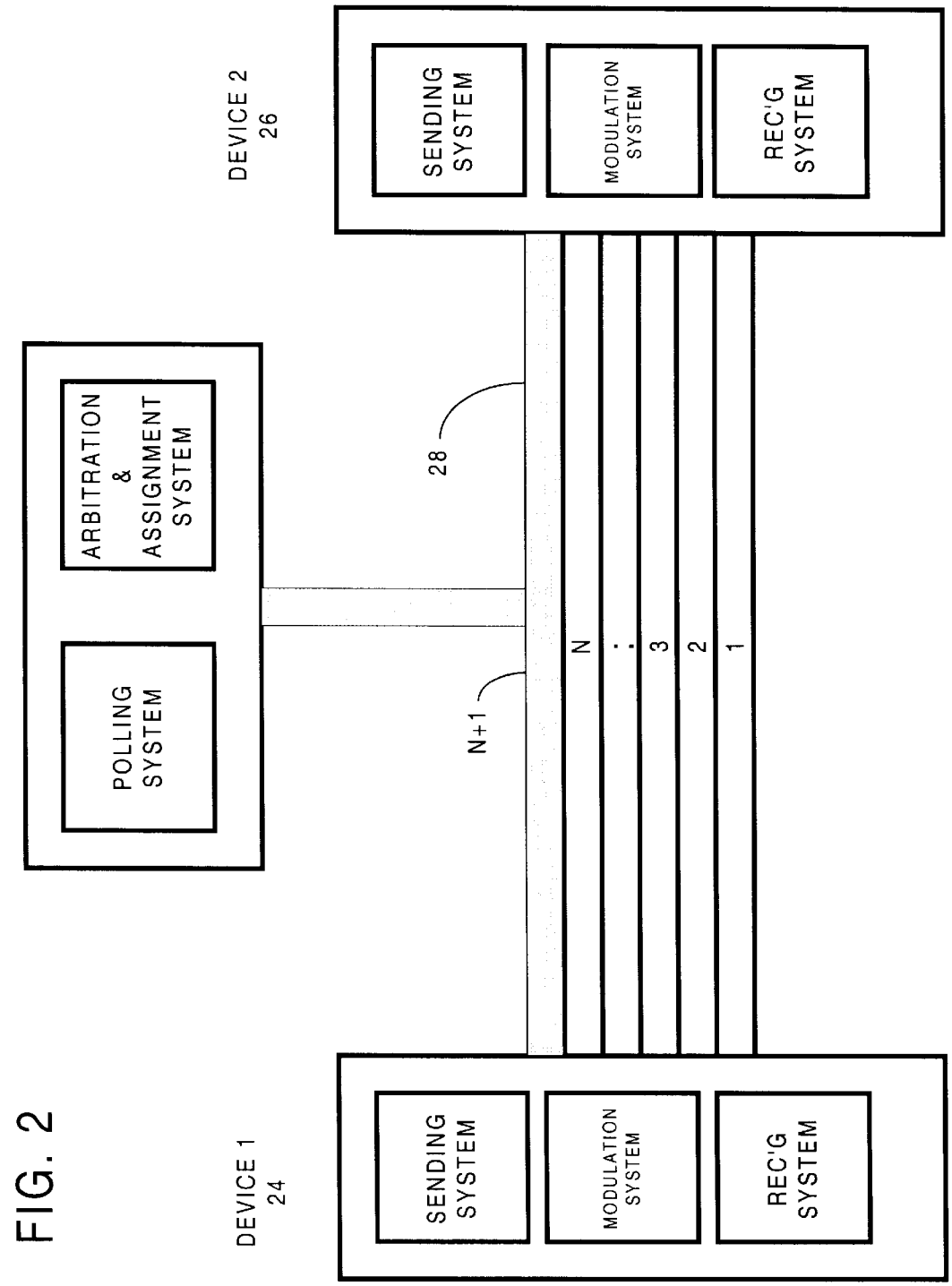
FIG. 2 depicts a traffic controller and the communication paths between two devices in accordance with a preferred embodiment of the present invention.

Referring now to FIG. 2, a simplified system is shown depicting devices 24 and 26, bus 28, and traffic controller 30. This figure depicts the basic components of a system for allowing communications between device 1 and device 2. Device 1 and device 2 are each shown containing a sending system and a receiving system for sending and receiving data, as will typically be the case for devices sharing a bus. In addition, both devices are equipped with a modulation system for altering the frequency at which communications are sent and received. When device 1 wants to send data to device 2, it first signals the traffic controller 30 that these devices require use of the bus 28. Pursuant to this embodiment, a communications request is forwarded over a dedication frequency band. It can be seen that bus 28 is divided into N+1 frequency bands with the Nth+1 frequency band dedicated to the traffic controller for the sending and receiving of communication requests. It should be noted that a dedicated wire or some other means could also be used to transmit such requests.

Traffic controller 30 includes a polling system that listens to all of the devices on the bus to determine which devices at any given time require bandwidth. As requests are made, the traffic controller 30 utilizes an arbitration and assignment system to dynamically assign frequency bands to devices requesting use of the bus. In this case, where device 1 wants to send data to device 2, the traffic controller receives the request via the polling system and then, based on various criteria, assigns a particular bandwidth to that communication by informing both the sending device 24 and the receiving device 26 of the selected bandwidth for their communication.

For example, the traffic controller 30 may instruct device 1 to utilize frequency band 1 for its communication with device 2. Device 1 would utilize its modulation system to modulate the communication to the proper frequency and then use its sending system to deliver that data across the bus at the predetermined frequency range. On the receiving end, device 2, also having been informed of the chosen frequency band, would then demodulate the communication for use by device 2.

It can be seen that this single communication may require only a fraction of the entire bandwidth available. Thus, simultaneous, parallel communications may occur over the same bus. The traffic controller may assign the entire bandwidth to one high priority communication path, or it might assign only a small portion of the total bandwidth to a slow input/output mode and divide the remaining bandwidth between two microprocessor nodes, each of which needs wide bandwidth to its main memory. The decision-making process for allocating bandwidth may include any heuristic suitable for optimizing performance.

As noted, the traffic controller may include either dedicated wires or a dedicated portion of the total bandwidth (e.g., the N+1 frequency band) for polling the devices sharing the bus and for communicating the allocation of bandwidth back to the devices. If an inactive device desires future bandwidth, the traffic controller can determine how much bandwidth is available and therefore determine which portion of the bandwidth to assign to the requesting device.

All of the devices utilized within this system may include means for recognizing and acknowledging their assigned bandwidth. This may be done with the modulation system in devices 24, 26 or any other readily available means. It is also envisioned that the traffic controller will include the ability to dynamically reallocate existing bandwidth assignments on the fly. This could readily be accomplished as above by retransmitting the assignments and monitoring the request lines for acknowledgment. Moreover, an ability would exist for load leveling based upon need and communication priority protocols.

Figure 3:
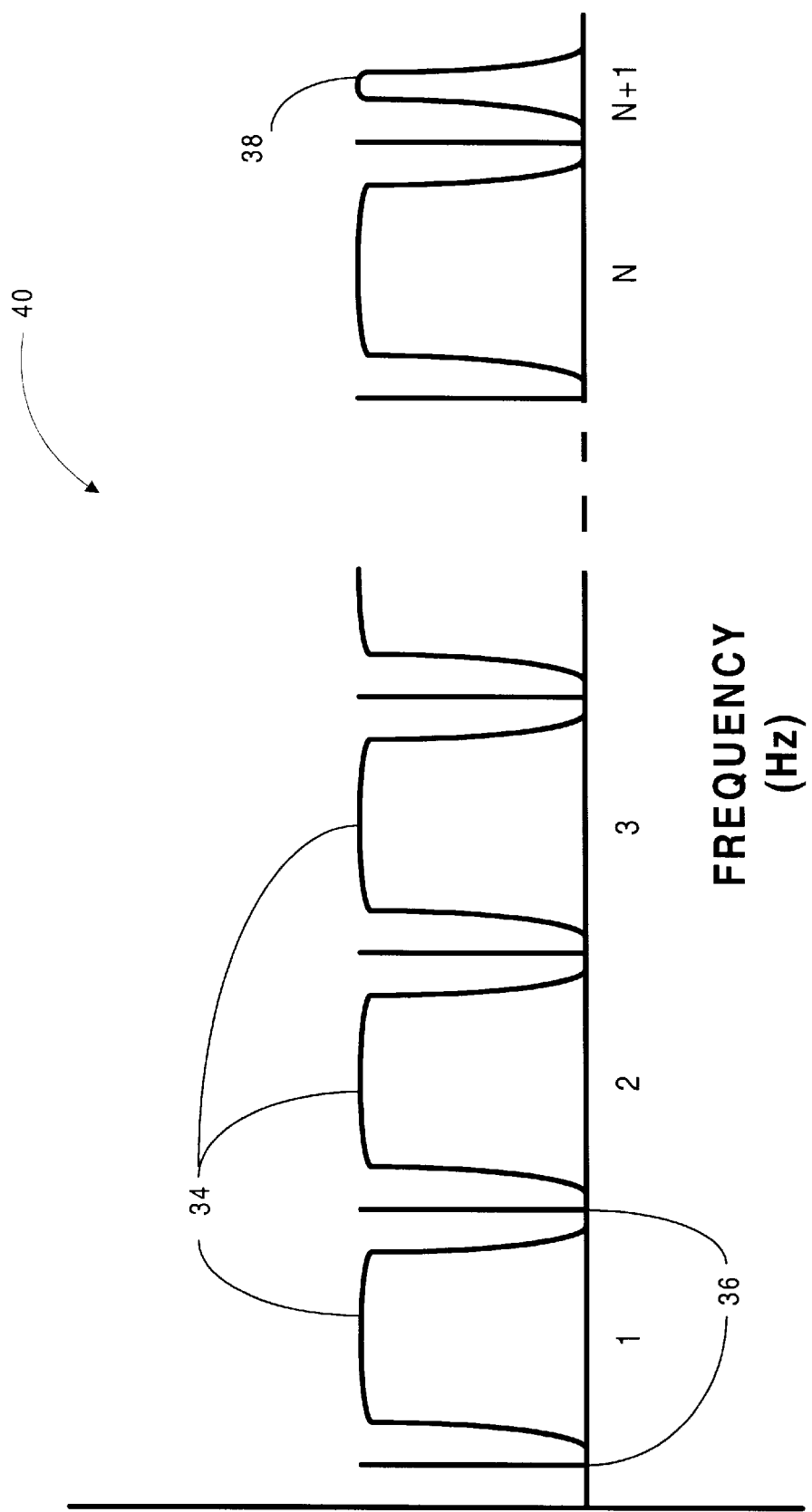
FIG. 3 depicts a frequency spectrum showing a plurality of frequency bands in accordance with a preferred embodiment of the present invention.

Referring now to FIG. 3, a frequency spectrum is shown broken up into N+1 frequency bands. It can be seen that frequency bands 1 through N are utilized to transmit data packets between various devices sharing the bus. Frequency band N+1, which may be smaller than the other packets, is utilized to communicate data 38 to and from the traffic controller. For spectrum efficiency reasons, the transmissions are assumed to be single sideband, much like television. The carrier will typically not be suppressed for reasons of network characterization.

It can be seen that in addition to the data being carried over the frequency bands 34, a subcarrier 36 is also included wherein each subcarrier has its own single sideband and associated packets of information. The amplitude information of each subcarrier characterizes the transfer path for its associated single side band. This information can be used by the receiving nodes to properly adjust the input gain and set the threshold levels within the receiver.

Figure 4:
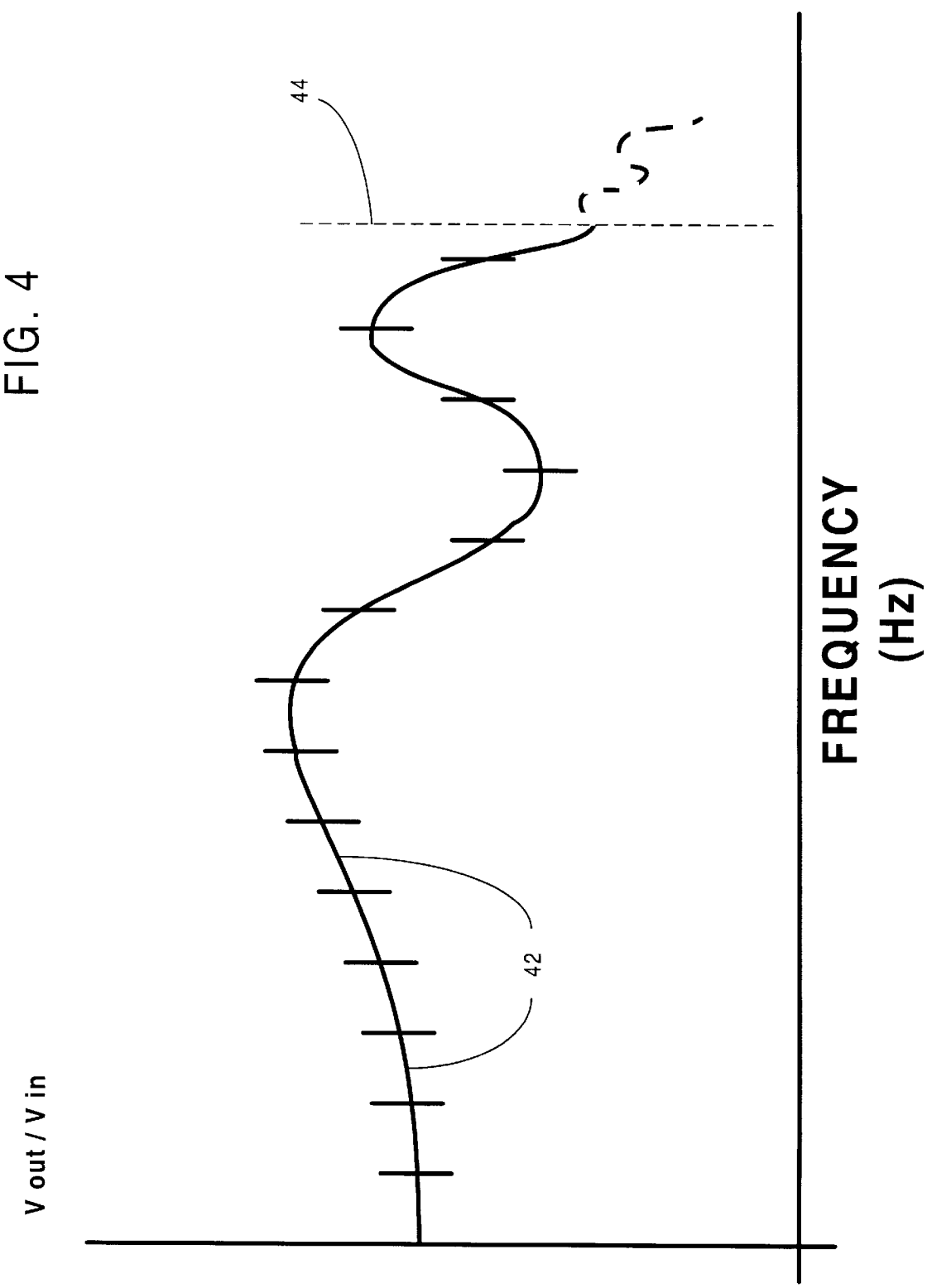
FIG. 4 depicts an arbitrary transfer characteristic of a signal across an entire frequency spectrum for a hypothetical communication path.

FIG. 4 illustrates an arbitrary transfer characteristic for an entire frequency spectrum. It can be seen that if data were to be sent serially at a high rate of speed over this transmission line there would be serious reflections and detecting binary levels would be problematic. However, when the frequency bands are broken up into smaller ranges 42, the transfer characteristics for each small range, below a maximum frequency 44, looks much more uniform and well behaved. Thus, the transfer characteristic between two devices on a system bus will be a function of the frequency selected, the position of the two devices on the bus and the other pluggable options actually in use at a given time.

In operation, the receiving nodes will receive both the sideband information and the subcarrier. Because the subcarrier is not suppressed, the receiver can determine the transfer characteristics from the relative amplitude of the carrier. The receiver can then use this information to adjust the input gain and set the thresholds for the incoming binary data (i.e., the ones and zeros). Thus, the discrimination level reflects the actual path the signals have taken and the relative attenuation or gain that the signals actually experience through that path. As a further refinement, two adjacent carriers can be used to interpolate the transfer characteristics for the intervening frequencies.

Because the incoming signal goes through a variable gain amplifier and its amplitude is set prior to signal detection, the communication signals of ones and zeros need not be "rail to rail" (i.e., binary data need not be in the exact form of 0 or 5 volts, but rather could exist at different signal levels). Communication signals on the order of 100 millivolts are anticipated for reasons of minimizing power dissipation. Because radio techniques are being utilized over short wires, the dynamic range of signals which must be received, amplified, level set and then detected is far smaller than the dynamic range of signals normally encountered in conventional radio applications. Finally, because data could be sent relatively slowly (e.g., 50 MHZ), synchronization and data skew should not be problematic.

While the invention has been particularly shown and described with reference for a few preferred exemplary embodiments thereof, it will be understood by those skilled in the art that various changes in form and details may be made therein without departing from the spirit and the scope of the invention.

We claim:

1. A microprocessor communication system comprising:
   a microprocessor bus having a frequency bandwidth selectively subdivided into a plurality of frequency bands;
   a plurality of nodes coupled to said bus, wherein at least one of said nodes is a central processing unit (CPU), and wherein at least one of said nodes includes a sending system for sending signals over said plurality of frequency bands, and at least one of said nodes includes a receiving system for receiving signals over said plurality of frequency bands; and
   a traffic controller coupled to said bus, said traffic controller including a system for dynamically assigning said frequency bands to each of said sending and receiving systems.

2. The communication system of claim 1 wherein said traffic controller further includes a mechanism for receiving communication requests from any of said plurality of nodes having sending systems.

3. The communication system of claim 2 wherein said traffic controller further includes a mechanism for arbitrating said communication requests.

4. The communication system of claim 2 wherein one of said plurality of frequency bands is dedicated to carrying said communication requests.

5. The communication system of claim 2 wherein said system for receiving communication requests by the traffic controller includes a polling system.

6. The communication system of claim 1 wherein at least one of said plurality of frequency bands includes a sub-carrier frequency for determining transfer characteristic data.

7. The communication system of claim 6 wherein at least one of said receiving systems includes a mechanism for receiving and analyzing transmission path characteristic data being transferred on said sub-carrier frequency.

8. A transmission line system comprising:
   a plurality of sending nodes wherein each sending node includes means for sending signals over a plurality of frequency bands, wherein one of the sending nodes is a central processing unit (CPU);
   a plurality of receiving nodes wherein each receiving node includes means for receiving signals over said plurality of frequency bands;
   a microprocessor bus coupled to said plurality of sending and receiving nodes, said microprocessor bus having a plurality of wires and sufficient bandwidth to support said plurality of frequency bands; and
   a traffic controller coupled to said bus, said traffic controller including means for receiving communication requests from each of said plurality of sending nodes and means for dynamically assigning frequency bands to each of said sending and receiving nodes.

9. The transmission line system of claim 8 wherein said traffic controller includes a polling system for detecting communication requests over a dedicated frequency band.

10. The transmission line system of claim 9 wherein said plurality of sending nodes include means for sending communication requests over said dedicated frequency band.

11. The transmission line system of claim 8 wherein said plurality of sending nodes include means for sending transmission path transfer characteristic data over a plurality of sub-carrier frequencies corresponding to each of said plurality of frequency bands.

12. The transmission line system of claim 8 wherein said plurality of receiving nodes include means for receiving transmission path transfer characteristic data over said plurality of sub-carrier frequencies corresponding to each of said plurality of frequency bands.

13. The transmission line system of claim 12 wherein said plurality of receiving nodes include means for interpreting transmission path transfer characteristic data and means for adjusting an input gain and setting a threshold level.

14. The transmission line system of claim 8 wherein said traffic controller includes a polling system for detecting communication requests over a dedicated set of wires.

15. The transmission line system of claim 8 further comprising a dissipative element connected to said bus.

* * * * *